Patented Jan. 25, 1944

2,339,929

UNITED STATES PATENT OFFICE 2,339,929

PREPARATION OF CATALYSTS

Augustus S. Houghton, Rivervale, N. J., assignor, by mesne assignments, to Allied Chemical & Dye Corporation, a corporation of New York No Drawing. Application July 20, 1939,
Serial No. 285,526

12 Claims. (Cl. 252—255)

This invention relates to catalysts for use in various catalytic processes such as hydrogenation, dehydrogenation and oxidation and more particularly to the production of such catalysts.

In catalyzing hydrogenation, dehydrogenation and oxygenation of organic materials, particularly vapor phase reactions, it is advantageous to employ as the catalyst masses of metal such as nickel, copper and cobalt having a surface layer or film of catalytically active compound or form of the metal. The high heat conductivity of the metal bases of such catalysts aids in distribution and transfer of the heat of reaction and facilitates temperature control of exothermic catalytic processes as compared with lower heat conductivity of bases such as particles of alundum or carborundum impregnated with the catalytic material. In carrying out some reactions there appears to be less tendency to produce undesirable reaction products when metal base catalysts are employed than when alundum- or carborundum-base catalysts are utilized; for example, hydrogenation of phenol to cyclohexanol utilizing masses of nickel coated with an adherent catalytically active layer is accompanied in some cases by formation of less cyclohexane than when the reaction is carried out in the presence of alundum or carborundum impregnated with nickel catalyst. Furthermore, metal masses having catalytically active surfaces may be arranged in bulk or space form, e. g., as assemblies of wire gauze or cages of metal particles, and possess the advantage over catalysts of the powder type for many purposes, especially continuous operations, in that they can more readily be uniformly distributed throughout the path of flow of vapors undergoing reaction, and reacted materials can be more readily separated continuously from such catalyst. Moreover, bulk type catalysts are desirable for the reason that they may be prepared, reactivated, introduced into and removed from the reaction chambers as masses of substantial size as distinguished from small particles, thereby greatly facilitating the handling of the catalyst.

It is an object of the invention to provide a process of producing catalytic material of improved capacity, ruggedness and life. By capacity is meant capability of the catalyst to catalyze a given amount of reactants passed thereover per unit of time; as between two catalysts the one which permits passage of the larger volume or amount of reactants per unit of time to give the same percentage of conversion or reaction is understood to have the greater capacity.

It is another object of the invention to provide a novel process for the production of catalytic materials involving a metallic mass having an adherent catalytically active surface. By "adherent surface" is meant a surface which is not readily detached from the underlying metal by water washing and not necessarily a surface which will withstand more vigorous action such as rubbing.

It is a further object of the invention to provide a novel process for reactivating catalysts whose activity has been impaired. Other objects and advantages will appear hereinafter.

In accordance with the invention, I produce an adherent catalytically active layer on the surfaces of masses of metal of the group nickel, copper and cobalt having thereon a surface layer of oxidizable compound of the metal, preferably a film of the metal oxalate, by subjecting the masses to oxidation in a solution of alkali metal hypohalite containing a molar concentration of alkali metal hydroxide of at least 4 and preferably of from 8 to 16 times the molar concentration of the hypohalite. Preferably, I employ a hypohalite solution containing 0.025 to 1 mol of sodium hypobromite per liter and a molar concentration of sodium hydroxide from 8 to 16 times that of the sodium hypobromite. Instead of sodium hypobromite, sodium hypochlorite may be utilized. The hydroxides, hypobromites and hypochlorites of other alkali metals such as potassium may also be employed.

The temperature of the solutions of alkali metal hypohalite and alkali metal hydroxide may vary within the range of from about 0 to 100° C.; solutions maintained at ordinary room temperature produce satisfactory results. Sodium hypobromite solutions of the desired strength and alkalinity may be prepared by adding measured quantities of bromine to sodium hydroxide solution. Sodium hypochlorite solutions may be prepared by mixing equimolar amounts of calcium hypochlorite and sodium carbonate, filtering and washing the precipitate, diluting the combined filtrate and washings with water to the desired strength and adding the desired amount of sodium hydroxide. Sodium hydroxide may also be added to commercially available sodium hypochlorite solutions. Preferably the hypohalite solutions employed in accordance with the invention contain from 0.4 to 1 mol of sodium hydroxide per liter and a molar amount of sodium hypohalite equal to from one-eighth to one-sixteenth the molar amount of sodium hydroxide present.

The process of this application may be employed to form adherent, active catalytic surfaces on masses of metallic nickel coated with an oxidizable layer of nickel compound, e. g., coated nickel turnings, rings, helices, wool, gauze, sheets, etc. Copper and cobalt catalysts may also be prepared in accordance with the invention.

In order to produce oxalate coated masses of metal for oxidation in accordance with the invention, I may immerse masses of metallic nickel, copper or cobalt in an oxalic acid solution, preferably of a concentration of from 0.1 to 1.5 normal so as to produce an adherent layer of the metal oxalate on the surface of the masses. If desired, other materials may be incorporated in the oxalic acid solution, e. g., nitric acid may be added to increase the reaction of the solution with the metal. After an adherent layer or film of the metal oxalate is formed on the surface of the metal masses, they are removed from the acid solution, drained and dried and the oxalate decomposed in a solution of alkali metal hypohalite and caustic alkali, as hereinabove described.

In some cases spent catalytic masses react with oxalic acid solution sufficiently rapidly so that the metal oxalate formed does not adhere satisfactorily to the surface. In order to promote the formation of an adherent oxalate coating on the spent catalytic masses, the masses may be treated to retard reaction of the acid solution with the metal, e. g., by immersion of the spent catalysts in a cold oxalic acid solution, roasting it in air to above 250° or 300° C., steaming it at a temperature of from 150° to 300° C., or heating it in hydrogen to above 400° C. Such cold oxalic acid or heating pretreatment prevents excessive rapidity of attack during the subsequent oxalic acid treatment and promotes formation of the adherent metal oxalate layer on the metal surface. The subsequent oxalic acid treatment may advantageously begin with the oxalic acid solution at a temperature of 50° C. or lower; the temperature of the acid solution may then be raised and maintained for the desired time in the neighborhood of boiling, e. g., from 95° to 100° C. Pretreatment involving immersion of the catalyst in cold oxalic acid or heating in air followed by immersion in oxalic acid at higher temperature and hypohalite treatment is effective in removing sulfur from poisoned catalysts. Incorporation of nitric acid in the oxalic acid solution with which the catalyst is treated after immersion in the cold oxalic acid or roasting is also effective in eliminating sulfur. Sulfur may also be removed by heating the spent catalyst in hydrogen up to a temperature above 450° C. followed by roasting if desired.

While I prefer to employ metal masses coated with an adherent surface layer of the metal oxalate, masses coated with other oxidizable compounds may be utilized. For example, an oxidizable film may be formed on the metal masses by treating them with nitric acid in liquid or vapor form and igniting the masses to produce a surface layer containing metal oxide; the masses may then be immersed in hypohalite solution. Moreover, the hypohalite treatment may be applied directly to spent catalytic metal masses having surfaces containing oxidizable metal oxide.

Promoters may be incorporated in the catalyst surface and where oxalic acid treatment is employed may be dissolved in the oxalic acid solution if soluble therein. If it is desired to employ a promoter insoluble in oxalic acid, it may be applied either before or after the oxalic acid treatment. Promoters may also be utilized when the catalyst is not treated with oxalic acid. For example, the masses of metal may be immersed in a cerous nitrate solution and then roasted or the masses may be immersed in a cerous nitrate solution just prior to the oxalic acid treatment.

Catalysts may be reactivated in accordance with the invention without removal from the reaction tubes in which they are utilized for catalyzing reactions, in which case the tubes and catalyst containers should be constructed of materials which are not deleteriously affected by the reactivating treatment, e. g., for nickel catalysts, nickel lined or nickel tubes and nickel containers may be employed.

The following examples are illustrative of the preparation of catalysts in accordance with the invention:

Example I

A nickel screen cage containing nickel wire helices was immersed in an aqueous oxalic acid solution of 1 normal concentration for two hours; the temperature of the solution was gradually raised from 70° to 90° C. The helices coated with an adherent surface layer of nickel oxalate were then removed from the solution, allowed to drain, and dried at a temperature of 100° to 200° C. The dried helices were successively immersed for about ten minutes in each of two aqueous solutions of sodium hypobromite and sodium hydroxide, each solution containing 0.05 mol of sodium hypobromite per liter and 0.4 mol of sodium hydroxide per liter. The time of immersion in each solution should be from 5 to 10 minutes longer than is required to blacken the surface of the turnings in the first solution. The helices were then washed with water until the washings were free of alkali; an automatic siphoning arrangement such as used in Soxhlet extractions may advantageously be employed in washing the catalyst.

Example II

A cage of nickel helices coated with nickel oxalate, drained and dried, as described in Example I, was immersed for about 11 minutes in a solution of sodium hypobromite and sodium hydroxide containing 0.063 mol of sodium hypobromite per liter and 0.882 mol of sodium hydroxide per liter. The helices were then removed from the solution and washed with water until the washings were free of alkali.

Example III

A cage of nickel turnings coated with nickel oxalate, drained and dried as described in Example I, was immersed for 30 minutes in an aqueous solution of sodium hypochlorite containing 0.1 mol of sodium hypochlorite per liter and 0.5 mol of sodium hydroxide per liter. The turnings were then removed from the solution and washed with water until the washings were free of alkali.

Example IV

A nickel screen cage of spent catalytic nickel wire helices having a surface containing nickel oxide was immersed for ten minutes in an aqueous solution containing 0.05 mol per liter of sodium hypobromite and 0.3 mol per liter of sodium hydroxide. The helices were then washed with water until the washings were free of alkali.

Example V

A nickel screen cage of spent catalytic nickel wire helices was immersed for about one hour in a cold aqueous 1 normal oxalic acid solution. The helices were then immersed in a 1 normal solution of oxalic acid at a temperature of about 70° C. and the temperature raised gradually to about 90° C. over a period of two hours, after which the helices were removed, drained and dried at a temperature of from 100° to 200° C. The helices were then successively immersed for about eight minutes in two solutions of sodium hypobromite and sodium hydroxide, each solution containing 0.07 mol of sodium hypobromite per liter and about 0.357 mol of sodium hydroxide per liter. The helices were then washed with water until the washings were free of alkali.

*Example VI*

A copper gauze cage containing copper turnings which had previously been surface oxidized by roasting in air were immersed in an 8 per cent solution of oxalic acid for five hours. The temperature of the acid solution was raised from 20° to 92° C. over a period of two hours and maintained at 92° C. for three hours. The cage of oxalate coated turnings was removed from the solution, drained and dried at 100° to 200° C. The dried turnings were then immersed in an aqueous solution of sodium hypobromite and sodium hydroxide containing 0.05 mol of sodium hypobromite per liter and 0.4 mol of sodium hydroxide per liter until oxidation of the copper oxalate as indicated by blackening of the surfaces of the turnings had occurred. The turnings were then washed with water until they were free of alkali.

Two nickel cages 36" long and 2" in diameter of catalyst produced in accordance with Example I were installed in a reaction chamber and a reaction mixture of hydrogen and benzol was passed over the catalyst for about five hours at a pressure of fifty pounds per square inch, a temperature of 200° to 300° C. and at a rate of 12.3 cc. liquid benzol per minute. More than 99 per cent of the benzol was converted to cyclohexane. Catalysts produced in accordance with Examples II and III were similarly employed for the catalytic conversion of benzol to cyclohexane.

Two cages 36" long and 2" in diameter of catalyst produced in accordance with Example IV were installed in a reaction chamber and a reaction mixture of hydrogen and benzol under a pressure of 50 pounds per square inch, at a temperature of 200° to 300° C. was passed over the catalyst at a rate of 10 cc. liquid benzol per minute for more than 4 hours. About 97 per cent of the benzol was converted to cyclohexane.

Two cages 36" long and 2" in diameter of the catalyst of Example V were installed in a reaction chamber and a reaction mixture of phenol and hydrogen was passed over the catalyst for more than 14 hours at a rate of 6.7 cc. liquid phenol per minute, pressure of 50 pounds per square inch and a temperature of 200° to 300° C. About 100 per cent conversion of the phenol to cyclohexanol was effected. Catalysts produced in accordance with Example VI were introduced into reaction chambers and used for catalyzing dehydrogenation of cyclohexanol to cyclohexanone, methyl cyclohexanol to methyl cyclohexanone and air oxidation of cyclohexanol to cyclohexanone.

The catalysts may be employed for the catalysis of many organic reactions, for example hydrogenation of materials such as benzol, toluol and tar acids, dehydrogenation of cyclohexanol and methyl cyclohexanol to cyclohexanone and methyl cyclohexanone and oxidation, e. g., air oxidation of cyclohexanol to cyclohexanone.

The process of this application yields catalysts of great ruggedness and high activity and capacity and has the advantage that it may be employed repeatedly to obtain catalysts of substantially the same activity and capacity. Furthermore, active catalytic surfaces may repeatedly be reactivated without undue loss of the metal.

Since certain changes may be made without departing from the scope of the invention, it is intended that the above shall be interpreted as illustrative and not in a limiting sense.

I claim:

1. A process of preparing catalytic material involving a mass of metal of the group consisting of nickel, copper and cobalt having an adherent catalytic surface which comprises treating a mass of said metal having a surface layer of oxidizable compound of the metal with a solution containing alkali metal hypohalite and caustic alkali, said solution containing from .025 to 1 mol of alkali metal hypohalite per liter the molar ratio of caustic alkali to the alkali metal hypohalite in the solution being at least 4 to 1.

2. The process of preparing catalytic material involving a mas of metal of the group consisting of nickel, copper and cobalt having an adherent catalytically active surface which comprises oxidizing the surface of a mass of said metal having a surface layer of oxidizable compound of the metal in a solution of alkali metal hypohalite and alkali metal hydroxide, said solution containing from .025 to 1 mol of alkali metal hypohalite per liter and the molar ratio of the alkali metal hydroxide to alkali metal hypohalite in the solution falling within the range of from 8:1 to 16:1.

3. The process of preparing catalytic material which comprises treating a mass of metallic nickel coated with a layer of oxidizable compound of the metal with a solution containing from 0.025 to 1 mol of sodium hypohalite of the group consisting of sodium hypobromite and sodium hypochlorite per liter and sodium hydroxide, the molar ratio of sodium hydroxide to sodium hypohalite in the solution falling within the range of 8:1 to 16:1.

4. The process of preparing catalytic material having an adherent catalytically active surface which comprises treating a mass of metallic nickel coated with a layer of oxidizable compound of the metal with a solution containing 0.4 to 1 mol of sodium hydroxide per liter and at least .025 mol per liter of sodium hypohalite of the group consisting of sodium hypobromite and sodium hypochlorite, the molar ratio of sodium hydroxide to sodium hypohalite being at least 4 to 1.

5. The process of preparing a catalyst involving a mass of metallic nickel having an adherent catalytically active surface comprising treating a mass of metallic nickel having a surface layer of nickel oxalate in a solution containing caustic soda and sodium hypohalite of the group consisting of sodium hypobromite and sodium hypochlorite, the molar ratio of caustic soda to the sodium hypohalite in the solution being at least 4 to 1.

6. The process of preparing a catalyst involving a mass of metallic nickel having an adherent catalytically active surface comprising treating a mass of metallic nickel with nitric acid, decomposing the resultant nitrate on the mass to produce a layer of nickel oxide, treating the resultant coated mass of nickel in a solution containing caustic soda and from .025 to 1 mol per liter of sodium hypohalite of the group consisting of sodium hypobromite and sodium hypochlorite, the molar ratio of the caustic soda to the sodium hypohalite in the solution falling within the range of from 8:1 to 16:1.

7. The process of reactivating nickel catalytic material involving a mass of metallic nickel having an oxidizable compound of nickel on its surface which comprises treating the mass in a solution containing caustic soda and from .025 to 1 mol per liter of hypohalite of the group consisting of sodium hypobromite and sodium hypochlorite to produce an adherent film of nickel oxide on the metallic nickel, the molar ratio of caustic soda to hypohalite in said solution falling within the range of 8:1 to 16:1.

8. The process of preparing a catalyst involving a mass of metallic nickel having an adherent catalytically active surface layer of nickel oxide comprising immersing a mass of metallic nickel having an oxidizable compound of nickel on its surface in a solution containing 0.4 to 1 mol of sodium hydroxide per liter and a molar amount of sodium hypobromite equal to from $\frac{1}{4}$ to $\frac{1}{16}$ the molar amount of sodium hydroxide present in said solution, removing said mass from said solution after blackening of the surface of the mass occurs and washing the mass until the washing liquid is free of alkali.

9. A process of preparing catalytic material comprising producing on a mass of metal of the group consisting of nickel, copper and cobalt an adherent layer of oxalate of the metal and treating the oxalate coated metal with a solution containing from .4 to 1 mol per liter of alkali metal hydroxide and at least .025 mol per liter of alkali metal hypohalite, the molar ratio of alkali metal hydroxide to alkali metal hypohalite in said solution being at least 4 to 1.

10. A process of preparing catalytic material involving a mass of metallic nickel having an adherent catalytically active surface layer which comprises treating a mass of metallic nickel with a solution containing oxalic acid to produce on the nickel an adherent surface layer of nickel oxalate, immersing said nickel oxalate coated mass in a solution containing 0.4 to 1 mol of sodium hydroxide per liter and sodium hypohalite of the group consisting of sodium hypobromite and sodium hypochlorite, the molar ratio of sodium hydroxide to sodium hypohalite in said solution being at least 4 to 1, and removing said mass from said solution after the surface thereof has become blackened.

11. A process of reactivating spent nickel catalytic material involving a mass of metallic nickel which comprises pretreating said mass to retard reaction of oxalic acid with the metal, treating said mass in a solution of oxalic acid to produce thereon an adherent surface layer of nickel oxalate, immersing said nickel oxalate coated mass in a solution containing sodium hydroxide and sodium hypohalite of the group consisting of sodium hypobromite and sodium hypochlorite, the molar ratio of sodium hydroxide to sodium hypohalite in said solution being at least 4 to 1.

12. A process for preparing a highly active adherent catalytic surface on a mass of a base metal of the type used in catalyzing hydrogenation reactions which comprises treating the mass of said metal previously subjected to a treatment that has produced a surface layer of a compound of the metal, which compound will by reaction form an oxide of the metal, with a solution of a mixture of an alkali metal hypohalite and an alkali metal hydroxide, the molar concentration of the hydroxide being at least 4 times the molar concentration of the hypohalite.

AUGUSTUS S. HOUGHTON.